(12) United States Patent
Watanabe

(10) Patent No.: US 7,961,246 B2
(45) Date of Patent: Jun. 14, 2011

(54) BLADE DRIVING DEVICE FOR USE IN CAMERAS

(75) Inventor: Nobuaki Watanabe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 912 days.

(21) Appl. No.: 10/720,084

(22) Filed: Nov. 25, 2003

(65) Prior Publication Data

US 2004/0105028 A1    Jun. 3, 2004

(30) Foreign Application Priority Data

Nov. 27, 2002    (JP) .................... 2002-343156

(51) Int. Cl.
  *H04N 5/235*    (2006.01)
  *H04N 5/238*    (2006.01)
  *G03B 9/08*    (2006.01)
  *G03B 9/10*    (2006.01)
(52) U.S. Cl. ......... 348/362; 348/363; 396/452; 396/495
(58) Field of Classification Search .......... 348/362–369, 348/208.16, 208.12, 221.1, 229.1, 231.1, 348/220.1; 396/463, 469, 508, 55, 194, 195, 396/452, 495, 496

See application file for complete search history.

(56) References Cited

U.S. PATENT DOCUMENTS

| | | | | |
|---|---|---|---|---|
| 4,119,986 A | * | 10/1978 | Koyama et al. | 396/463 |
| 4,299,464 A | * | 11/1981 | Cushman | 396/157 |
| 4,984,003 A | * | 1/1991 | Matsumoto et al. | 396/463 |
| 5,012,271 A | * | 4/1991 | Nishimura et al. | 396/234 |
| 5,173,728 A | * | 12/1992 | Sangregory et al. | 396/454 |
| 5,634,149 A | * | 5/1997 | Jeong et al. | 396/89 |
| 5,764,292 A | * | 6/1998 | Yamaguchi | 348/363 |
| 6,104,878 A | * | 8/2000 | Toguchi et al. | 396/52 |
| 6,304,726 B1 | * | 10/2001 | Watanabe | 396/53 |
| 6,547,457 B2 | * | 4/2003 | Yaginuma et al. | 396/460 |
| 2002/0167603 A1 | * | 11/2002 | Kato et al. | 348/341 |
| 2004/0105028 A1 | * | 6/2004 | Watanabe | 348/363 |

FOREIGN PATENT DOCUMENTS

| | | |
|---|---|---|
| JP | 1-310329 | 12/1989 |
| JP | 4-281684 | 10/1992 |
| JP | 6-70224 | 3/1994 |
| JP | 8-254729 | 10/1996 |
| JP | 2001-183718 | * 7/2001 |

* cited by examiner

*Primary Examiner* — Nhan T Tran
*Assistant Examiner* — Tuan H Le
(74) *Attorney, Agent, or Firm* — Wenderoth, Lind & Ponack, L.L.P.

(57) ABSTRACT

A blade driving device for use in cameras that includes a mechanical shutter blade that openably and closably disposed in front of a CCD, and is capable of blocking light passing through an exposure aperture. The blade driving device also includes a motor that drives the shutter blade, and a control means that drive-controls the motor. In this blade driving device, photography is performed such that the storage of an electric charge starts in the CCD and the closing motion of the shutter blade is completed. Opening energization is applied to the motor in order to allow the shutter blade to pre-perform an opening motion before performing a closing motion whenever a still image is photographed. Thus, the shutter blade always reaches an opened state prior to photography even if the shutter blade is closed without permission by receiving an impulsive force from the outside because of, for example, being dropped. Therefore, photography can be reliably performed.

11 Claims, 14 Drawing Sheets

BLADE DRIVING DEVICE FOR USE IN CAMERAS

BACKGROUND OF THE INVENTION

1. Field of the Invention

This invention relates to a blade driving device for use in cameras. The blade driving device is openably and closably disposed in front of an image pickup element and is capable of shielding an exposure aperture from part or all of light passing through the aperture. The blade driving device is also capable of reducing the light passing therethrough. More particularly, the invention relates to a blade driving device for use in cameras that is mounted on a portable information terminal such as a portable telephone or a portable personal computer.

2. Description of the Related Art

As a conventional digital still camera provided with an image pickup element, such as a CCD (charge coupled device), there is known a camera in which a mechanical shutter blade disposed in front of a CCD opens and closes an optical path. When the camera is in a photographic standby state, the CCD starts storing an electric charge as shown in FIG. 1, in response to a releasing operation while keeping the mechanical shutter blade in an open state. When a predetermined period of exposure time passes, an electromagnetic actuator, such as a motor, is supplied with an electric current for closing and the mechanical shutter blade is controlled to close the exposure aperture (see Japanese Unexamined Patent Publication No. Hei-4-281684, Japanese Unexamined Patent Publication No. Hei-6-70224, and Japanese Unexamined Patent Publication No. Hei-1-310329, for example).

Using the conventional digital still camera, the mechanical shutter blade of the camera is kept in a state of opening the optical path by, for example, a magnetic urging force of the electromagnetic actuator when the camera is in a standby state prior to photography.

A similar mechanical shutter blade can be used in, for example, a mobile camera mounted on a portable telephone or a portable personal computer. In this application, an occasion could arise where the camera receives an external impulsive force or the like caused when the camera is accidentally dropped or is bumped against another object. Additionally, the chance of receiving such an impulsive force will increase if the mobile camera is used more often than a general digital camera.

There could also be a case in which, when such an impulsive force is applied from the outside, the camera is in a photographic standby state. In this state, the shutter blade being in an opened state is freely closed by the impulsive force so that photography cannot be disadvantageously performed.

SUMMARY OF THE INVENTION

The present invention has been made in consideration of the aforementioned circumstances. It is therefore an object of the present invention to, (e.g. when a mobile camera mounted on a portable information terminal, such as a portable telephone or a portable personal computer, and is provided with a mechanical blade such as, a shutter blade, diaphragm blade, or ND filter blade) provide a blade driving device for use in cameras. The blade driving device enables the camera to perform desired photography while allowing the mechanical blade to reliably perform its function. For example, the mechanical blade can reliably perform a closing motion even when the camera receives an impulsive force from the outside, which can be caused by dropping it or bumping it in a photographic standby state.

The blade driving device according to a first aspect of the present invention includes a mechanical blade, an electromagnetic actuator, and a control means. The mechanical blade is openably and closably disposed in front of an image pickup element and that is capable of blocking a part or all of light passing through an exposure aperture or capable of reducing light passing therethrough. The electromagnetic actuator enables the blade to perform an opening motion according to opening energization and enables the blade to perform a closing motion according to closing energization. The control means provides for drive-controlling the electromagnetic actuator, in which case the control means applies opening energization to the electromagnetic actuator in each photographing operation to allow the blade to pre-perform an opening motion before performing a closing motion.

According to this embodiment, since the electromagnetic actuator invariably undergoes opening energization (i.e., the electromagnetic actuator is supplied with an electric current sufficient to allow the blade to perform a complete opening operation, not to allow the blade to be merely positioned) whenever photography is performed from the photographic standby state even if the blade is either in an opened state or in a closed state, the blade remains or is kept in the opened state when the blade is already in the opened state, and the blade performs an opening motion when the blade is in the closed state.

Therefore, when the device is used in a portable information terminal or the like photography can be reliably performed. More specifically, the blade is always in the opened state prior to photography even if the blade being kept in the opened state is closed without permission by an impulsive force or the like from the outside. Thus, photography can be reliably performed. Additionally, since opening energization is invariably performed without judging the state of the blade, a control operation can be simplified.

According to the first aspect of the present invention, the control means can employ a structure in which closing energization is performed after opening energization is applied to the electromagnetic actuator when a releasing operation is performed.

According to this embodiment, since opening energization is applied to the electromagnetic actuator with a releasing operation as a starting point (trigger), an opening motion of the blade is invariably performed merely by performing a control operation at least once immediately before photography.

Also, according to the first aspect of the present invention, the blade can be a shutter blade that opens and closes the aperture, a diaphragm blade that stops down the aperture to a predetermined aperture diameter, or an ND filter blade that reduces the amount of light to a predetermined level.

An opening motion of the shutter blade is performed when the shutter blade is closed in a photographic standby state, and an opening motion of the diaphragm blade is performed when the diaphragm blade is closed and reaches a stopped-down state in a photographic standby state. An opening motion of the ND filter blade is performed when the ND filter blade is closed in a photographic standby state, so that the device is returned to a non-light-shielding state.

The blade driving device according to a second aspect of the present invention includes a mechanical blade, an electromagnetic actuator, and a control means. The mechanical blade is openably and closably disposed in front of an image pickup element and is capable of blocking a part or all of light passing through an exposure aperture or capable of reducing light passing therethrough. An electromagnetic actuator enables the blade to perform an opening motion according to opening energization and enables the blade to perform a closing motion according to closing energization. A control means provides for drive-controlling the electromagnetic actuator, in which the control means applies opening energization to the electromagnetic actuator in order to allow the blade to pre-perform an opening motion before performing a closing motion when the amount of light incident on the image pickup element becomes equal to or less than a predetermined level in a photographic standby state.

According to this embodiment, when the blade (completely or partially) closes the aperture by an impulsive force or the like from the outside in the photographic standby state, light passing through the aperture is (completely or partially) blocked. The amount of light incident on the image pickup element becomes equal to or less than a predetermined level. Therefore, based on information about a change in the amount of light, opening energization is applied to the electromagnetic actuator (i.e., the electromagnetic actuator is supplied with an electric current sufficient to allow the blade to perform a complete opening operation, not to allow the blade to be merely positioned), and the blade performs the opening motion. Since opening energization is applied thereto only when the blade has been closed in the photographic standby state, power consumption can be reduced.

In the second aspect of the present invention, the blade can be a shutter blade that opens and closes the aperture, a diaphragm blade that stops down the aperture to a predetermined aperture diameter, or an ND filter blade that reduces the amount of light to a predetermined level.

An opening motion of the shutter blade is performed when the shutter blade is closed in a photographic standby state, and an opening motion of the diaphragm blade is performed when the diaphragm blade is closed and reaches a stopped-down state in a photographic standby state. An opening motion of the ND filter blade is performed when the ND filter blade is closed in a photographic standby state, so that the device is returned to a non-light-shielding state.

The blade driving device according to a third aspect of the present invention includes a mechanical blade, an electromagnetic actuator, and a control means. The mechanical blade is openably and closably disposed in front of an image pickup element and is capable of blocking a part or all of light passing through an exposure aperture or capable of reducing light passing therethrough. The electromagnetic actuator enables the blade to perform an opening motion according to opening energization and enables the blade to perform a closing motion according to closing energization. The control means provides for drive-controlling the electromagnetic actuator. Specifically, the control means applies opening energization to the electromagnetic actuator in order to allow the blade to pre-perform an opening motion before performing a closing motion when a signal is output from a shock sensor used to detect an impulsive force in a photographic standby state.

According to this structure, the blade is regarded as having (completely or partially) closed the aperture when a signal is output from a shock sensor because of a dropping of the device or a bumping thereof against another object in the photographic standby state. An opening energization is then applied to the electromagnetic actuator (i.e., the electromagnetic actuator is supplied with an electric current sufficient to allow the blade to perform a complete opening operation, not to allow the blade to be merely positioned), and the blade performs the opening motion.

Therefore, preferably, the level of an impulsive force at which the blade is invariably closed is calculated beforehand, and opening energization is applied thereto when a signal output from the shock sensor becomes equal to or more than a predetermined level.

In the device according to the third aspect of the present invention, the blade can be a shutter blade that opens and closes the aperture, a diaphragm blade that stops down the aperture to a predetermined aperture diameter, or an ND filter blade that reduces the amount of light to a predetermined level.

According to this embodiment, when a signal is output from the shock sensor in a photographic standby state, the shutter blade is regarded as having been closed so that an opening motion of the shutter blade is performed. When a signal is output from the shock sensor in a photographic standby state, the diaphragm blade is regarded as having been closed and having reached a stopped-down state so that an opening motion of the diaphragm blade is performed. And, when a signal is output from the shock sensor in a photographic standby state, the ND filter blade is regarded as having been closed so that an opening motion of the ND filter blade is performed. Thus, the device is returned to a non-light-shielding state.

DETAILED DESCRIPTION OF THE PREFERRED EMBODIMENTS

Embodiments of the present invention will be hereinafter described with reference to the accompanying drawings.

Figure 1:
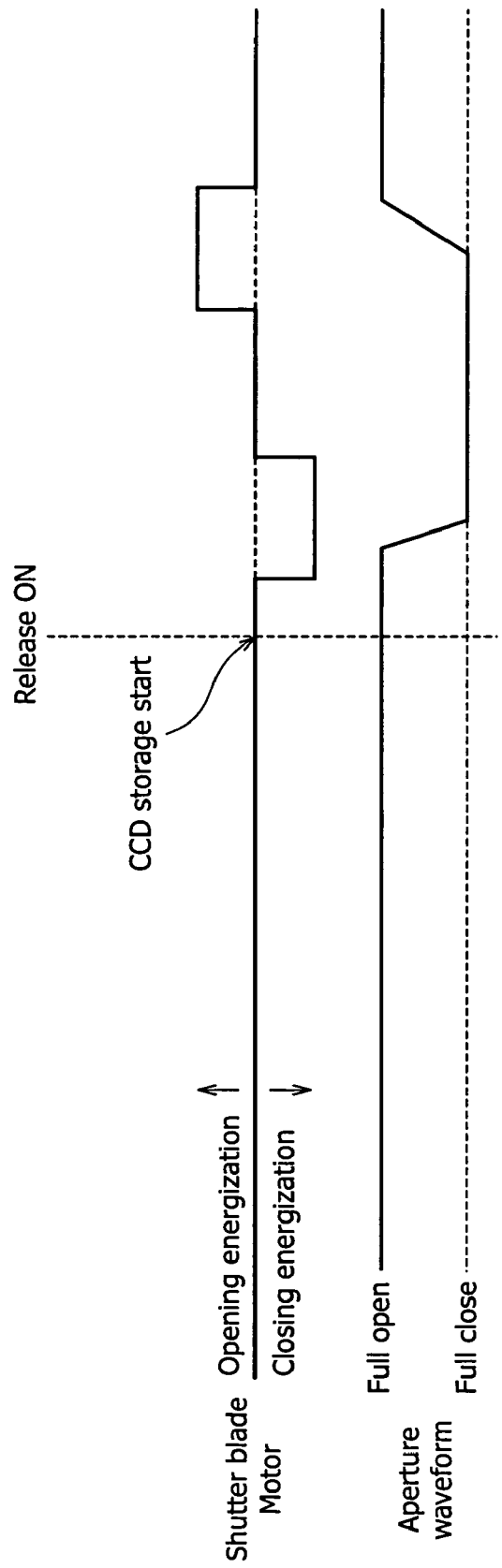
FIG. 1 is a time chart that shows a driving control of a conventional blade driving device for use in cameras.
Figure 2:
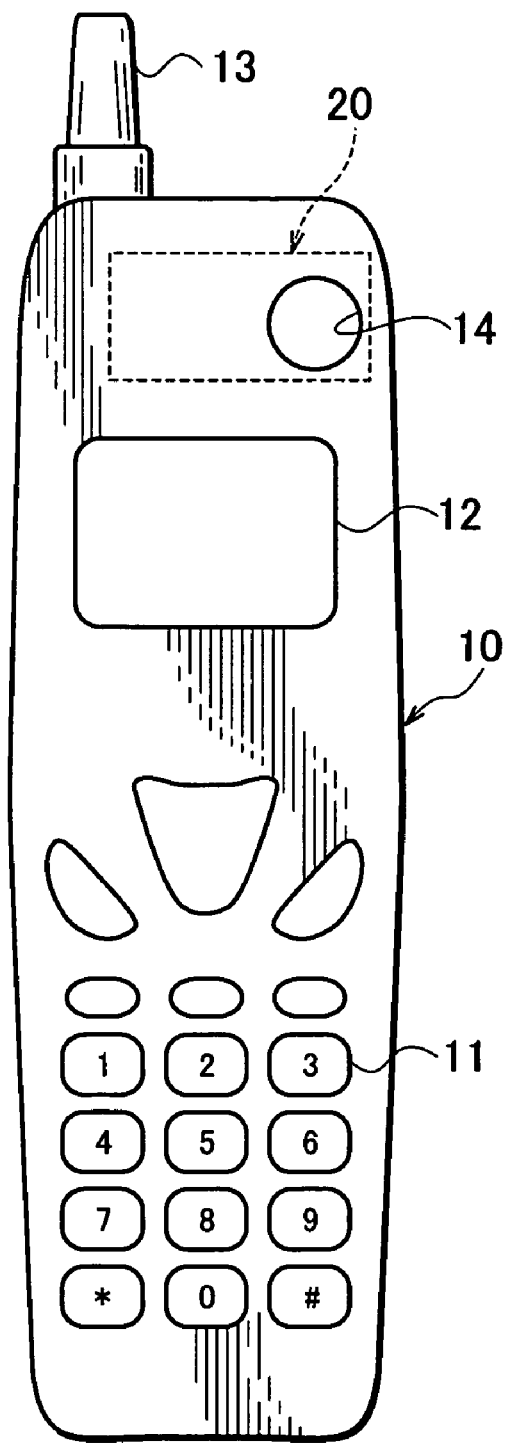
FIG. 2 is a front view that shows the exterior of a portable telephone to which a blade driving device for use in cameras according to the present invention is applied.

As shown in FIG. 2, a portable telephone is used as a portable information terminal to which one embodiment of a blade driving device for use in cameras according to the present invention is applied. In FIG. 2, an operating button 11 that performs various operations and a monitor 12 that displays various information are disposed on the surface of a main body 10. An antenna 13 that sends and receives signals is extensibly provided on the upper end of the main body 10, and a photographic window 14 is provided in the surface of the main body 10 in the vicinity of the monitor 12. A camera unit 20 is provided in the interior of the main body 10 behind the photographic window 14, and a circuit board on which various electronic parts constituting a control circuit and other circuits is disposed in the other areas (not shown).

Figure 3:
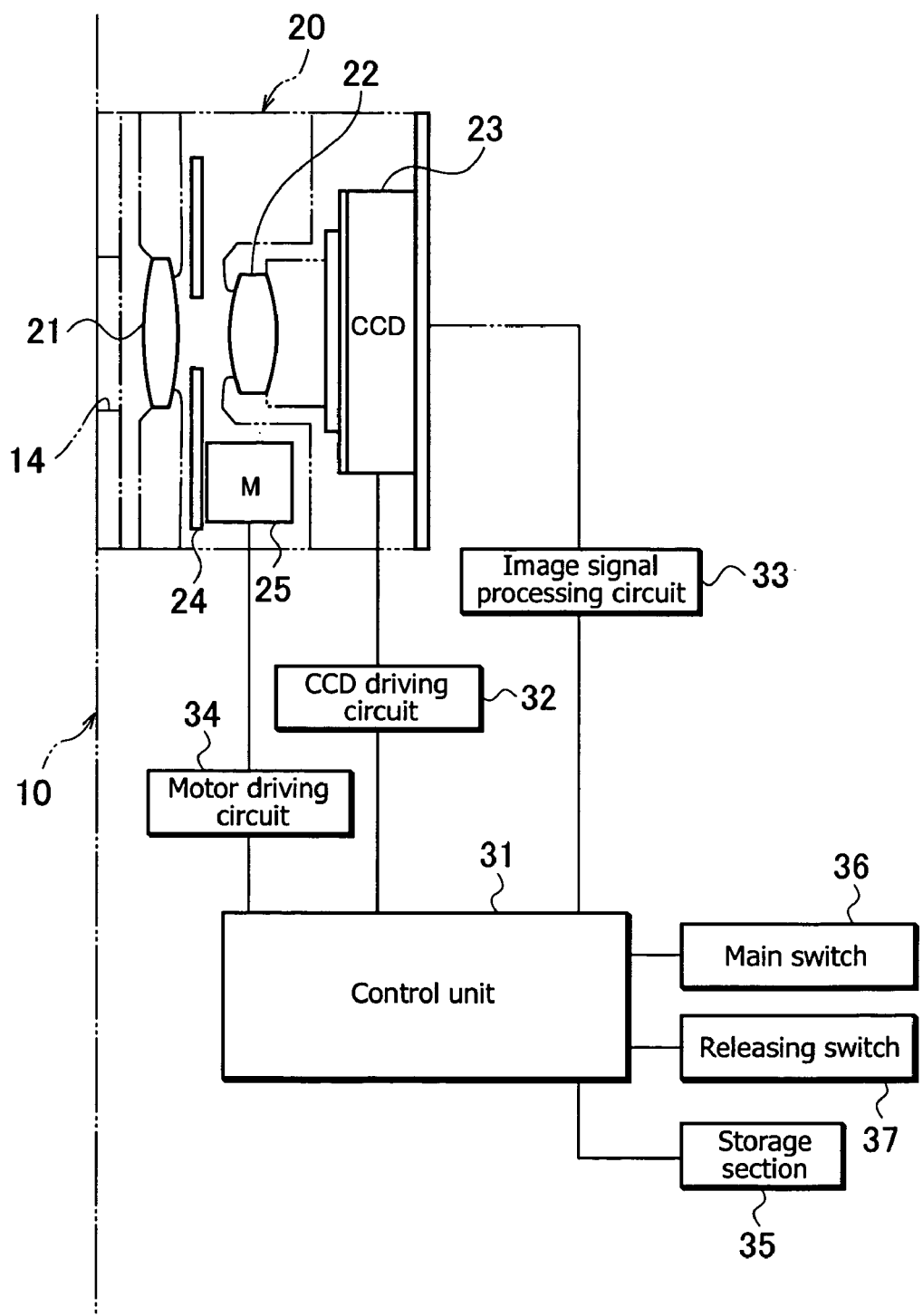
FIG. 3 is a block diagram that shows a control circuit used to drive the blade driving device.

As shown in FIG. 3, the camera unit 20 is fixed to the inner wall of the main body 10, and includes lenses 21 and 22, a CCD (charge coupled device) 23 serving as an image pickup element, a shutter blade 24 that is disposed between the lens 21 and the lens 22 and that opens and closes an optical path, and a moving magnet type motor 25 serving as an electromagnetic actuator that drives the opening and closing of the shutter blade 24.

Figure 4:
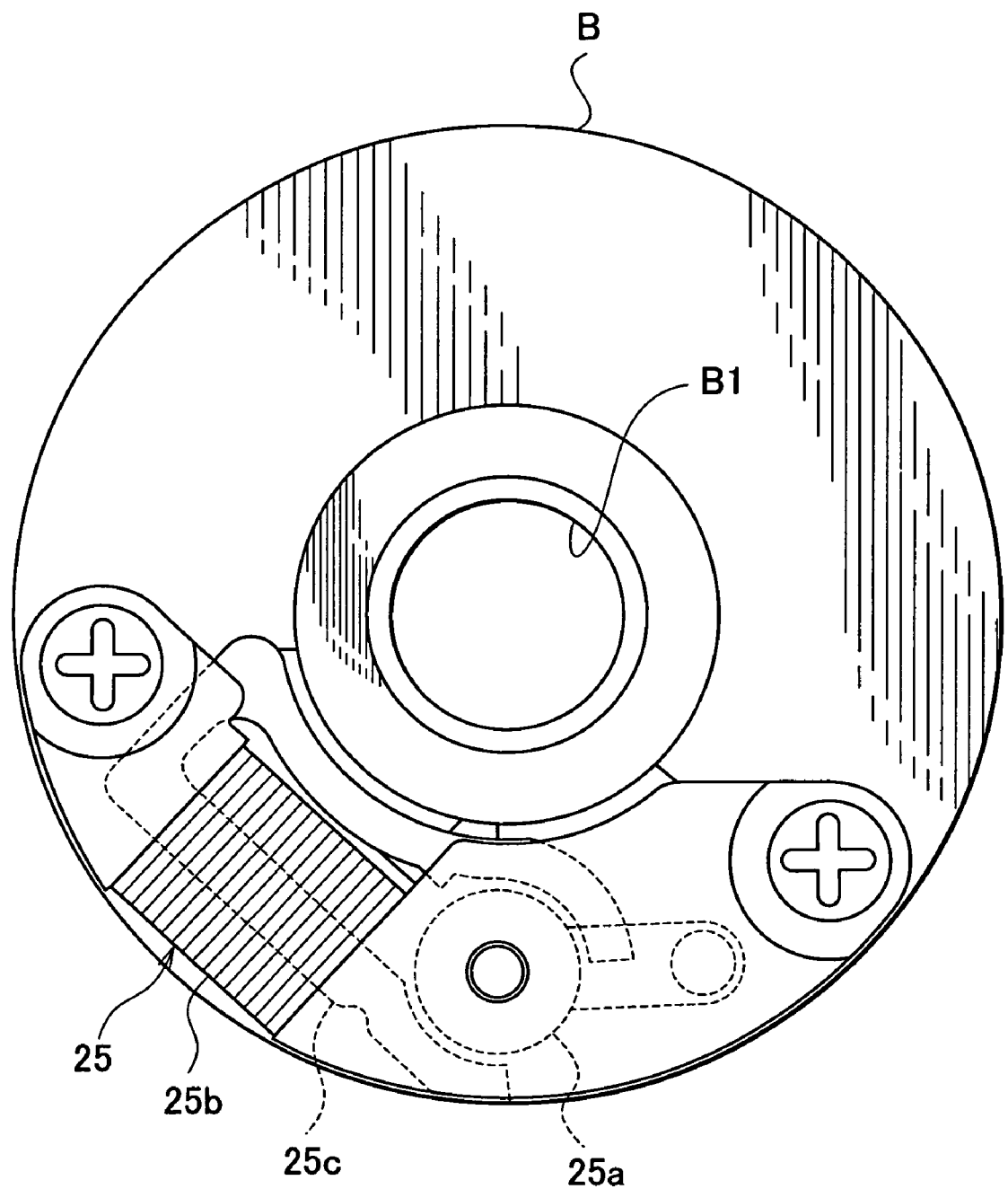
FIG. 4 is a front view that shows the blade driving device.
Figure 5:
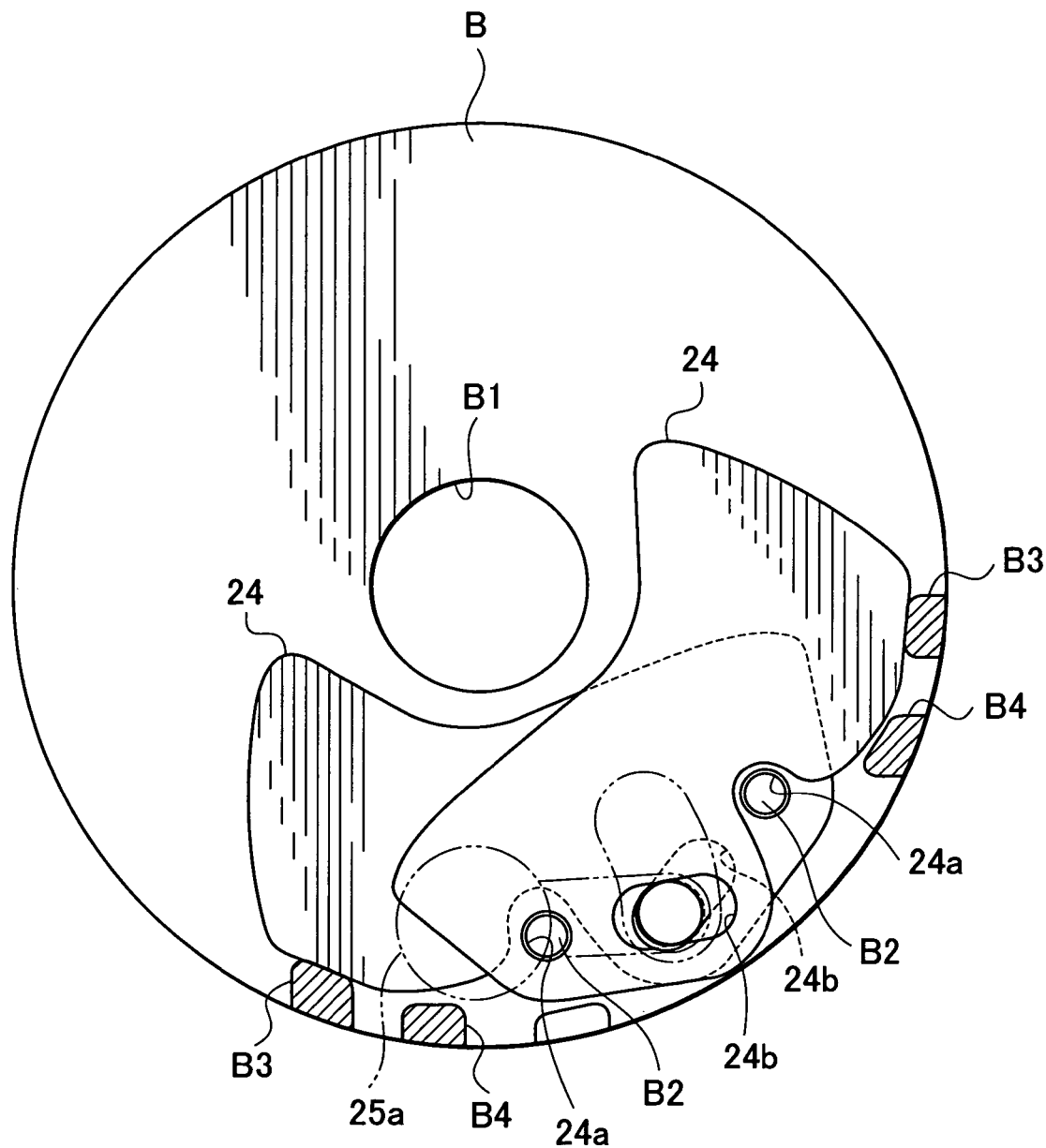
FIG. 5 is a plan view that shows the interior of the blade driving device.

As shown in FIG. 4 and FIG. 5, the motor 25 is attached to a base B having an exposure aperture B1, and is made up of a rotor 25a that has a driving pin connected to the shutter blade 24 and a cylindrical permanent magnet. The rotor 25a rotates within a predetermined angular range. The base B also includes a magnetizing coil 25b, a yoke 25c that forms a magnetic circuit around the rotor 25a, etc. When opening energization is applied to the coil 25b, the rotor 25a rotates clockwise as shown in FIG. 5 so as to allow the shutter blade 24 to make an opening motion. When closing energization is applied to the coil 25b, the rotor 25a rotates counterclockwise so as to allow the shutter blade 24 to make a closing motion.

When the coil 25b is in a non-energization state, the rotor 25a is held at both ends of a rotatable range by a magnetic urging force so as to maintain the opened state or closed state of the shutter blade 24.

As shown in FIG. 5, the shutter blade 24 has a circular hole 24a into which a spindle B2 is inserted and a long hole 24b into which the driving pin of the rotor 25a is inserted. The shutter blade is positioned in contact with a stopper B3 at the position where the aperture B1 is completely opened, whereas the shutter blade 24 is positioned in contact with a stopper B4 at the position where the aperture B1 is completely closed.

As shown in FIG. 3, the control circuit is made up of a control unit 31 that generates various control signals and includes a CPU serving as a control means for managing the entire control, a CCD driving circuit 32 for turning on and off an electric-power supply to the CCD 23, an image signal processing circuit 33 for processing the signals of images taken by the CCD 23, a motor driving circuit 34 for controlling the energization of the motor 25, a storage section 35 for storing various information, a main switch 36 of the camera unit 20, a releasing switch 37 for performing a releasing operation of the camera unit 20, a display circuit (not shown) of the monitor 12, a transmitting-and-receiving-signal processing circuit (not shown) for performing the transmitting-and-receiving processing of signals through the antenna 13, etc. A part of the operating button 11 disposed on the surface of the main body 10 is shared as the main switch 36 and the releasing switch 37.

The control unit 31 performs calculation processing, determination processing, etc., based on various detection signals or based on command signals by an operation and generates various control signals. For example, the control unit 31 determines the light-quantity level of reflected light from a photographic subject and calculates exposure time most suitable for photography based on image information obtained through the CCD 23 and the image signal processing circuit 33.

When an operator performs a releasing operation and the releasing switch 37 is turned on, the control unit 31 generates a control signal to the motor driving circuit 34 so that the motor driving circuit 34 pre-performs opening energization prior to closing energization to the motor 25 in each photographing operation.

When a photographic standby state for a still image is made together with a state in which a dynamic image can be photographed by the camera unit 20 and when a non-photographic standby state for a still image is made in a state in which a dynamic image cannot be photographed, the main switch 36 turns on and off an electric-power supply to the CCD 23 through the control unit 31 and the CCD driving circuit 32.

When the main switch 36 is in an ON state, the motor driving circuit 34 applies opening energization to the motor 25 and brings the shutter blade 24 into an opened state. Thereafter, the energization is cut off, and the opened state of the shutter blade 24 is maintained by a magnetic urging force. Therefore, the CCD 23 can photograph a dynamic image in this opened state.

On the other hand, when the main switch 36 is in an OFF state, the motor driving circuit 34 applies closing energization to the motor 25 and brings the shutter blade 24 into a closed state. Thereafter, the energization is cut off, and the closed state of the shutter blade 24 is maintained by a magnetic urging force. Therefore, the CCD 23 cannot perform photography in this closed state.

The releasing switch 37 is operated when the still image of a photographic subject is photographed in the ON state of the main switch 36 (i.e., in the photographic standby state for a still image). For example, the CCD 23 is temporarily turned off and again turned on, and is then initialized, by one push operation (releasing) of one of the operating button 11 through the CCD driving circuit 32, then starts storing an electric charge, and is turned off after a predetermined period of time (exposure time) passes.

Referring now to a time chart of FIG. 6, a description will be given of a photographic operation that is performed when a photographic subject is photographed with the camera unit 20 in the portable telephone and a method for driving the shutter blade. First, when the main switch 36 of the camera unit 20 is turned on, electric power is supplied to the CCD 23. Opening energization is applied to the motor 25 through the motor driving circuit 34, so that the shutter blade 24 reaches an opened state in which an optical path is opened (i.e., the aperture B1 is opened). In this opened state, a dynamic image can be photographed with the camera unit 20, and, simultaneously, a photographic standby state in which a still image is photographed is reached.

Figure 6:
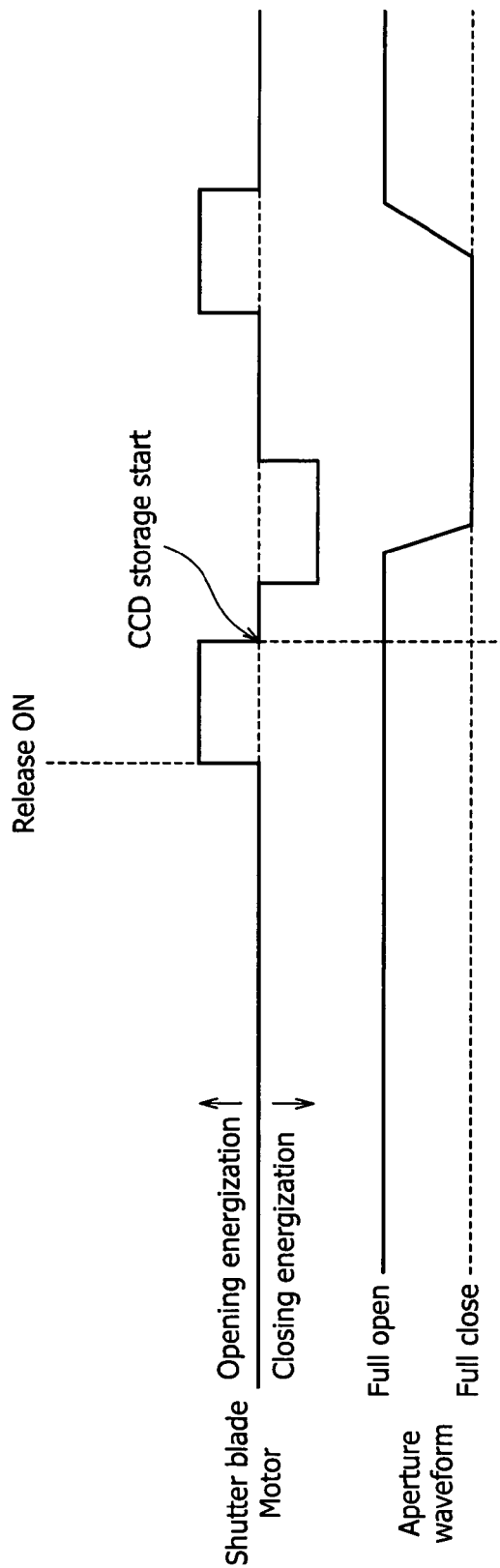
FIG. 6 is a time chart that shows a driving control of the blade driving device.

When an operator performs a releasing operation herein so as to turn on the releasing switch 37, opening energization is first applied to the motor 25 through the motor driving circuit 34 as shown in FIG. 6 (i.e., the motor 25 is supplied with an electric current sufficient to completely move the shutter blade 24 from a closed state to an opened state).

If the portable telephone is not dropped or is not bumped against another object at this time, that is, when the main body 10 is in a state of receiving no impulsive force from the outside, the shutter blade 24 is already in an opened state, and this state is maintained.

On the other hand, when the portable telephone is dropped or bumped, and the main body 10 receives an impulsive force exceeding a predetermined level so that the shutter blade 24 moves to the closed state without permission, the shutter blade 24 is brought into an appropriate opened state by the motor 25. As a result, a photographable state is reached.

Thereafter, the amount of light of a photographic subject is measured on the basis of an image signal of the CCD 23, and exposure time is calculated. The CCD 23 is temporarily turned off through the CCD driving circuit 32 and is again turned on to start storing the electric charge. After a predetermined period of time (exposure time) passes, closing energization is applied to the motor 25 through the motor driving circuit 34 as shown in FIG. 6, and the shutter blade 24 immediately makes a closing motion. As a result, the photography of the still image is completed.

Thereafter, the image signal stored in the CCD 23 is stored in the storage section 35 through the image signal processing circuit 33. Opening energization is again applied to the motor 25 through the motor driving circuit 34, and the shutter blade 24 is brought into the opened state. Thereby, it becomes possible to photograph a dynamic image, and, simultaneously, a photographic standby state for the still image is reached.

As described above, regardless of whether the shutter blade 24 is in the opened state or in the closed state, the control unit 31 applies opening energization to the motor 25 so as to bring the shutter blade 24 into the opened state immediately before photographing a still image, especially when a releasing operation is performed. Therefore, for example, when the main body 10 receives an impulsive force from the outside so as to close the shutter blade 24 without permission, the device can be reliably returned to the photographable state. Additionally, since opening energization is invariably applied in each photographing operation regardless of the state of the shutter blade 24, the control operation can be simplified.

Figure 7:
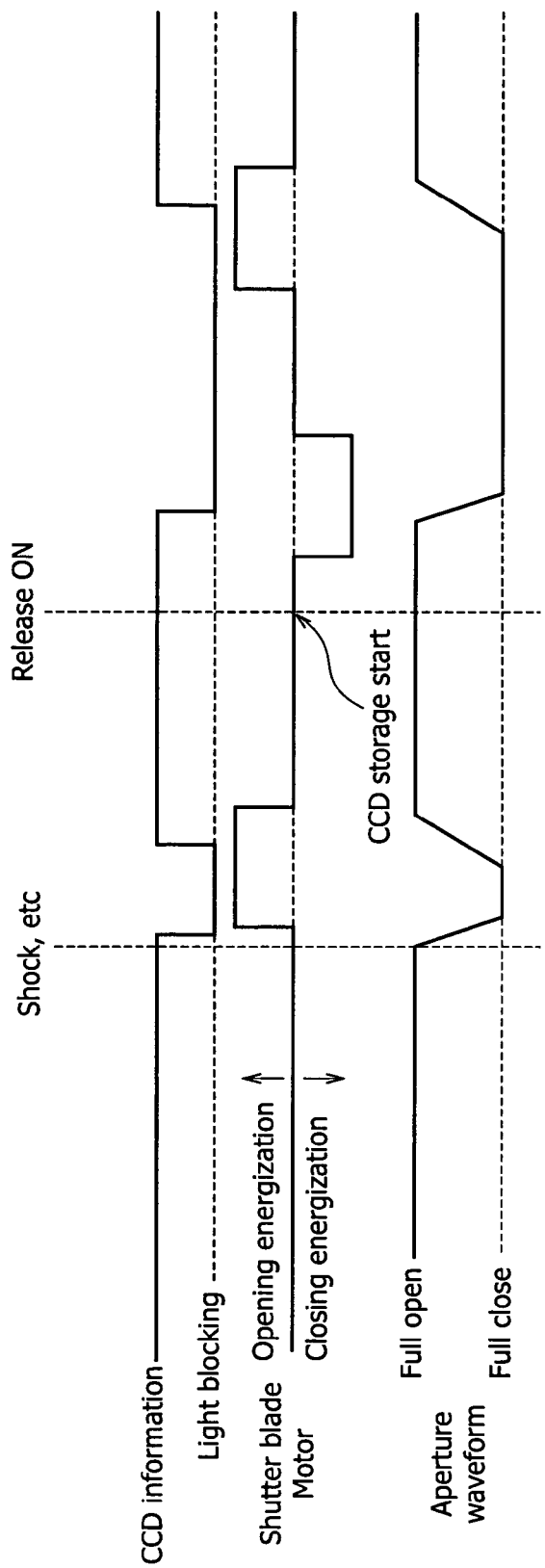
FIG. 7 is a time chart that shows another driving control of the blade driving device.

FIG. 7 is a time chart that shows another embodiment of the blade driving device for use in cameras according to the present invention. In this embodiment, the control unit 31 judges a light-quantity level of reflected light from a photographic subject based on image information obtained through the CCD 23 and the image signal processing circuit 33. From a judgment result of this light-quantity level, when the amount of light is below a predetermined level regardless of the fact that the camera unit 20 is in a photographic standby state, the shutter blade 24 is regarded as being in a state of completely or partially closing the optical path. A control signal is then generated to the motor driving circuit 34 so as to apply opening energization to the motor 25.

With reference to the time chart of FIG. 7, a description will be given of the photographing operation in this embodiment and a method for driving the shutter blade. First, when the main switch 36 of the camera unit 20 is turned on, electric power is supplied to the CCD 23. Opening energization is applied to the motor 25 through the motor driving circuit 34, so that the shutter blade 24 reaches an opened state in which the optical path is opened (i.e., the aperture B1 is opened). In this opened state, a dynamic image can be photographed with the camera unit 20, and, simultaneously, a photographic standby state in which still image is photographed is reached.

In the photographic standby state for a still image, when the portable telephone is dropped or bumped so that the main body 10 receives an impulsive force exceeding a predetermined level, and the shutter blade 24 moves to a closed state without permission as shown in FIG. 7. The control unit 31 judges that the amount of light is below a predetermined level according to an image signal (shade information) of the CCD 23 (i.e., the control unit 31 judges that the shutter blade 24 is closed), and opening energization is beforehand applied to the motor 25 through the motor driving circuit 34 (i.e., the motor 25 is supplied with an electric current sufficient to completely move the shutter blade 24 from a closed state to an opened state). Thereby, the shutter blade 24 is brought into an appropriate opened state, and, as a result, a photographable state is reached.

On the other hand, if the portable telephone is not dropped or is not bumped against another object, that is, when the main body 10 is in a state of receiving no impulsive force from the outside, the shutter blade 24 is already in an opened state. Therefore, the control unit 31 maintains the photographic standby state without generating any control signals.

when the operator performs a releasing operation and turns on the releasing switch 37, the amount of light of a photographic subject is measured on the basis of an image signal of the CCD 23, and exposure time is calculated. Thereafter, the CCD 23 is temporarily turned off through the CCD driving circuit 32 and is again turned on to start storing the electric charge. After a predetermined period of time (exposure time) passes, closing energization is applied to the motor 25 through the motor driving circuit 34 as shown in FIG. 7, and the shutter blade 24 immediately makes a closing motion. Thereby, the photography of a still image is completed.

Thereafter, the image signal stored in the CCD 23 is stored in the storage section 35 through the image signal processing circuit 33. Opening energization is again applied to the motor 25 through the motor driving circuit 34, and the shutter blade 24 is brought into the opened state. Thereby, it becomes possible to photograph a dynamic image, and, simultaneously, a photographic standby state for a still image is reached.

As described above, since the control unit 31 applies opening energization to the motor 25 so as to bring the shutter blade 24 into the opened state only when the amount of light obtained from the CCD 23 is below a predetermined level, a wasteful control operation is not performed when the shutter blade 24 is already in the opened state, and therefore power consumption and the like can be reduced correspondingly thereto.

Figure 8:
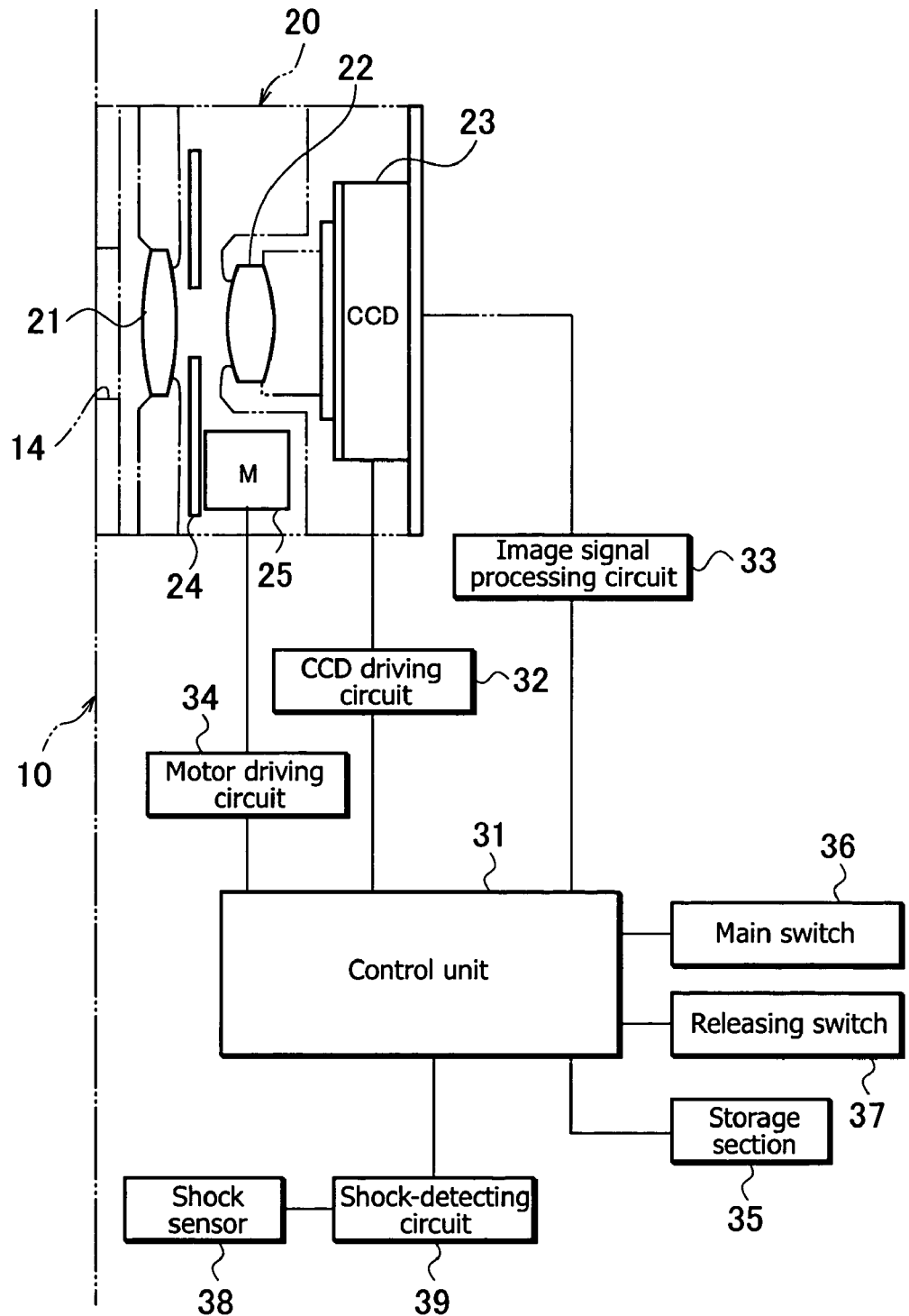
FIG. 8 is a block diagram that shows another control circuit used to drive the blade driving device according to the present invention.
Figure 9:
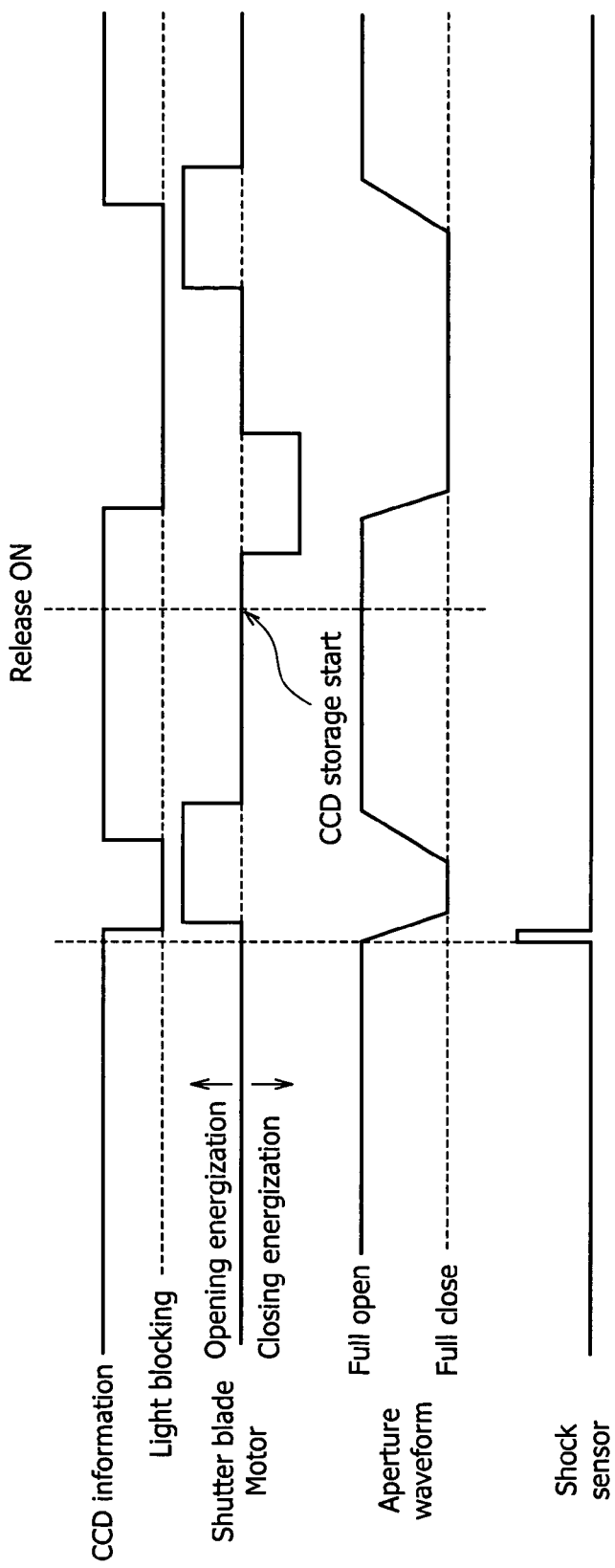
FIG. 9 is a time chart that shows a driving control in the control circuit shown in FIG. 8.

FIG. 8 and FIG. 9 are a block diagram and a time chart, respectively, showing a control circuit to which a still another embodiment of the blade driving device for use in cameras according to the present invention is applied. Herein, the same symbol is given to the same structure as in the aforementioned embodiment, and a description thereof is omitted.

In this embodiment, a shock sensor 38 mounted on the main body 10 and a shock-detecting circuit 39 for detecting an impulsive force based on a signal output from the shock sensor 38 are added to the control circuit as shown in FIG. 8.

In the state in which the camera unit 20 is in a photographic standby state, when signals are output from the shock sensor 38 and the shock-detecting circuit 39, the control unit 31 generates a control signal to the motor driving circuit 34 so as to apply opening energization to the motor 25 while judging that the shutter blade 24 is in a state of completely or partially closing the optical path (i.e., a state of blocking a part or all of light passing through the aperture B1).

The shock sensor 38 is fixed to the inner wall surface of the main body 10 and outputs a signal in accordance with an impulsive force received from the outside when the main body 10 is dropped or is bumped against another object. The shock sensor 38 can include for example, an acceleration sensor that outputs a signal in accordance with acceleration occurring when a shock is received, a pressure sensor using a piezoelectric element or the like that outputs a signal in accordance with pressure received directly from a shock.

The shock-detecting circuit 39 detects an impulsive force on the basis of an output signal of the shock sensor 38 and outputs a detection signal to the control unit 31. Preferably, in the shock-detecting circuit 39, the level of an impulsive force, by which the shutter blade 24 always moves from an opened state to a closed state, is beforehand calculated. When a signal output from the shock sensor 38 exceeds this level (predetermined level), a signal is output to the control unit 31. Based on this signal, a control signal by which the control unit 31 applies opening energization to the motor 25 is generated.

Referring to the time chart of FIG. 9, a description will be given of the photographing operation in this embodiment and a method for driving the shutter blade. First, when the main switch 36 of the camera unit 20 is turned on, electric power is supplied to the CCD 23, and opening energization is applied to the motor 25 through the motor driving circuit 34, so that the shutter blade 24 reaches an opened state in which an optical path is opened (i.e., the aperture B1 is opened). In this opened state, a dynamic image can be photographed with the camera unit 20, and, simultaneously, a photographic standby state in which a still image is photographed is reached.

If the portable telephone is dropped or bumped and, as a result, the main body 10 receives an impulsive force exceeding a predetermined level in the photographic standby state for the still image. A detection signal is output from the shock sensor 38 and the shock-detecting circuit 39. Based on this detection signal, as shown in FIG. 9, the control unit 31 regards the shutter blade 24 as being closed, and beforehand applies opening energization to the motor 25 through motor driving circuit 34 (i.e., the motor 25 is supplied with an electric current sufficient to completely move the shutter blade 24 from the closed state to the opened state). Thereby, the shutter blade 24 being in the closed state is brought into the appropriate opened state, and a photographable state is reached.

If the shutter blade 24 is in the opened state regardless of the fact that it has received an impulsive force exceeding the predetermined level, the shutter blade 24 is kept in the opened state without being changed even if opening energization is applied to the motor 25.

On the other hand, if the portable telephone is not dropped or is not bumped against another object, in other words, when the main body 10 is in a state of receiving no impulsive force from the outside, the shutter blade 24 is already in an opened state, and no signal is output from the shock sensor 38 and the shock-detecting circuit 39. Therefore, the control unit 31 maintains the photographic standby state without generating any control signals.

When the operator performs a releasing operation and turns on the releasing switch 37, the amount of light of a photographic subject is measured on the basis of an image signal of the CCD 23, and exposure time is calculated. Thereafter, the CCD 23 is temporarily turned off through the CCD driving circuit 32 and is again turned on to start storing the electric charge. After a predetermined period of time (exposure time) passes, closing energization is, applied to the motor 25 through the motor driving circuit 34 as shown in FIG. 9, and the shutter blade 24 immediately makes a closing motion. Thereby, the photography of a still image is completed.

Thereafter, the image signal stored in the CCD 23 is stored in the storage section 35 through the image signal processing circuit 33. Opening energization is again applied to the motor 25 through the motor driving circuit 34, and the shutter blade 24 is brought into the opened state. Thereby, it becomes possible to photograph a dynamic image, and, simultaneously, a photographic standby state for a still image is reached.

As described above, since the control unit 31 applies opening energization to the motor 25, so as to bring the shutter blade 24 into the opened state only when a signal exceeding a predetermined level is output from the shock sensor 38, a wasteful control operation is not performed when the shutter blade 24 does not receive an impulsive force by which the shutter blade 24 is closed. Therefore, power consumption and the like can be reduced correspondingly thereto.

FIG. 10 through FIG. 13 are schematic diagrams and a time chart showing still another embodiment of the blade driving device for use in cameras according to the present invention. Herein, the same symbol is given to the same structure as in the aforementioned embodiment, and a description thereof is omitted.

Figure 10:
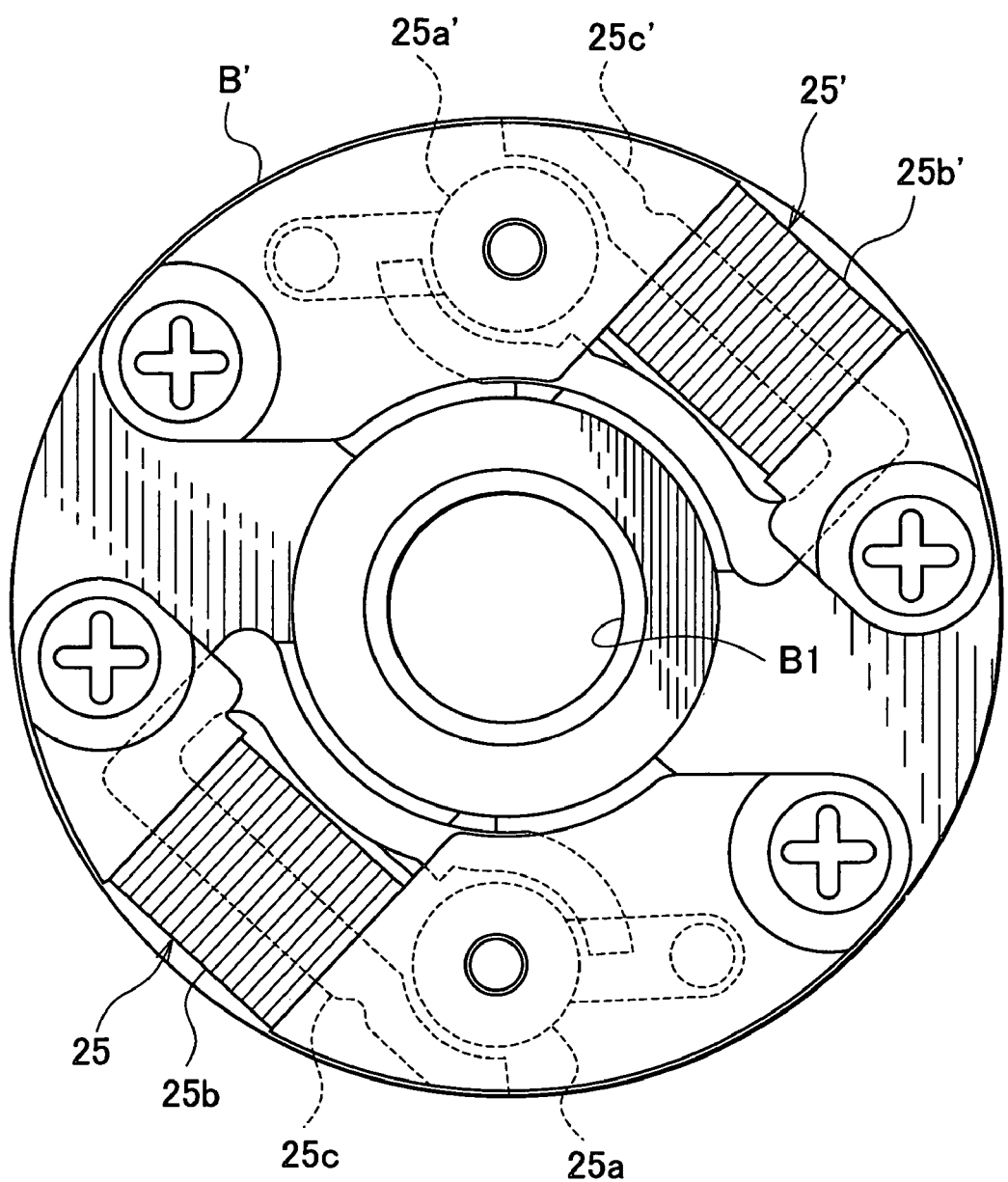
FIG. 10 is a front view that shows another embodiment of the blade driving device according to the present invention.
Figure 11:
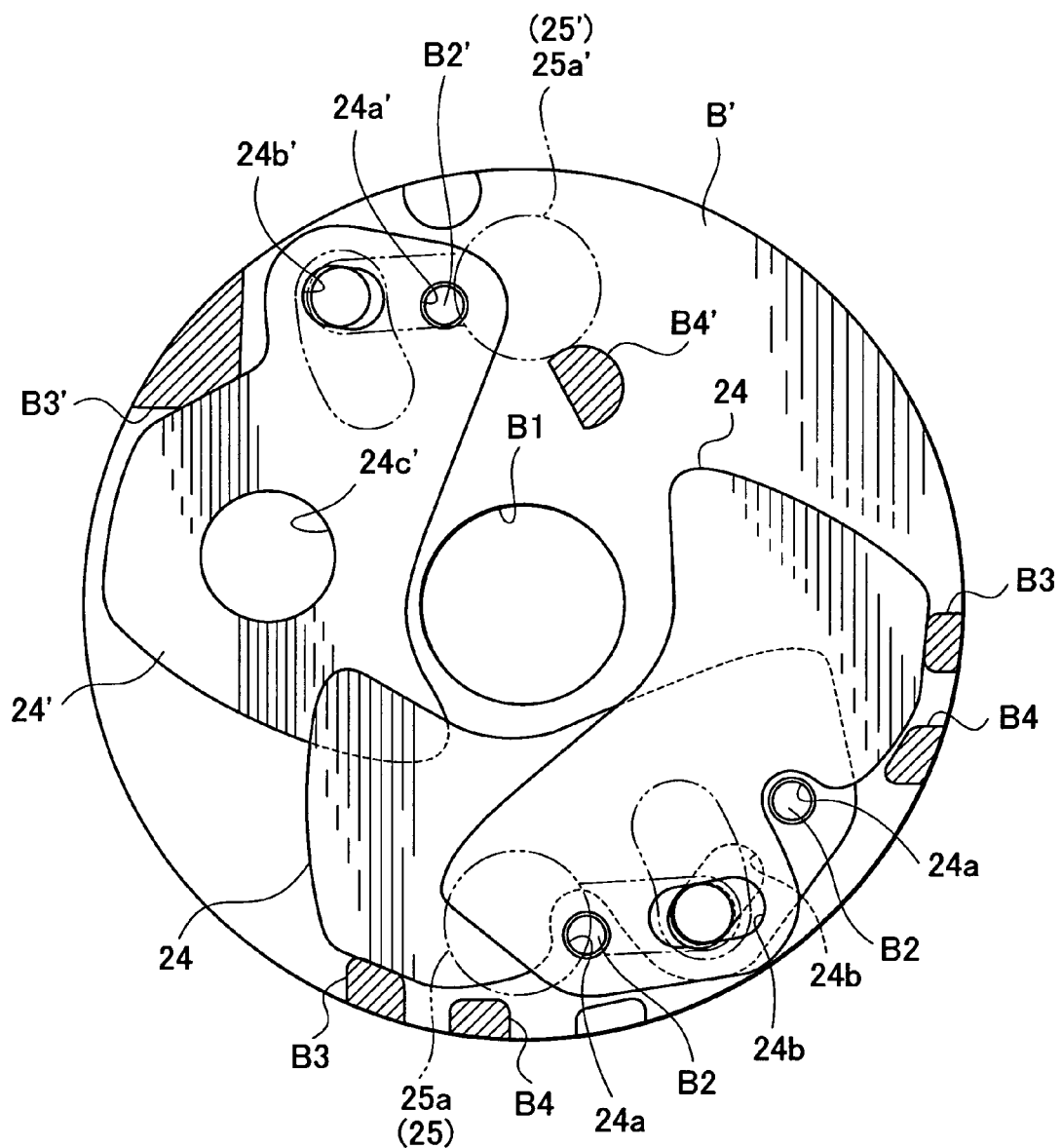
FIG. 11 is a plan view that shows the interior of the blade driving device shown in FIG. 10.

In this embodiment, as shown in FIG. 10 and FIG. 11, two motors 25 and 25', a shutter blade 24 that opens and closes an exposure aperture B1, and a diaphragm blade 24' that stops down the aperture B1 to a predetermined aperture diameter are attached to a base B' having an exposure aperture B1. Herein, the shutter blade 24 is a mechanical blade that can block all of the light passing through the aperture B1, and the diaphragm blade 24' is a mechanical blade that can block a part of the light passing through the aperture B1. As mentioned above, the motor 25 can cause the shutter blade 24 to make an opening motion and a closing motion.

On the other hand, the motor 25' has substantially the same structure as the motor 25 and is made up of a rotor 25a' that has a driving pin connected to the diaphragm blade 24' and a cylindrical permanent magnet and that rotates within a predetermined angular range, a magnetizing coil 25b', a yoke 25c' that forms a magnetic circuit around the rotor 25a', etc. When opening energization is applied to the coil 25b', the rotor 25a' rotates clockwise as shown in FIG. 11 so as to allow the diaphragm blade 24 ' to make an opening motion (non-stopping-down motion), and, when closing energization is applied to the coil 25b', the rotor 25a' rotates counterclockwise so as to allow the diaphragm blade 24' to make a closing motion (i.e., a stopping-down motion).

When the coil 25b' is in a non-energization state, the rotor 25a' is held at both ends of a rotatable range by a magnetic urging force so as to maintain the opened state (non-stopped-down state) or closed state (stopped-down state) of the diaphragm blade 24'.

As shown in FIG. 11, the diaphragm blade 24' has a circular hole 24a' into which a spindle B2' is inserted and a long hole 24b' into which the driving pin of the rotor 25a' is inserted, and is positioned in contact with a stopper B3' at the non-stopping-down position where the aperture B1 is completely opened, whereas the diaphragm blade 24' is positioned in contact with a stopper B4' at the stopping-down position where the aperture B1 is partially closed.

Referring now to the time charts of FIG. 6 and FIG. 12, a description will be given of the photographing operation performed when a photographic subject is photographed with the camera unit 20 in the portable telephone and a method for driving the shutter blade and the diaphragm blade. First, when the main switch 36 of the camera unit 20 is turned on, electric power is supplied to the CCD 23, and opening energization is applied to the motors 25 and 25' through the motor driving circuit 34. The shutter blade 24 and the diaphragm blade 24' reach an opened state in which an optical path is opened (i.e., the aperture B1 is opened). In this opened state, a dynamic image can be photographed with the camera unit 20, and, simultaneously, a photographic standby state in which a still image is photographed is reached.

Figure 12:
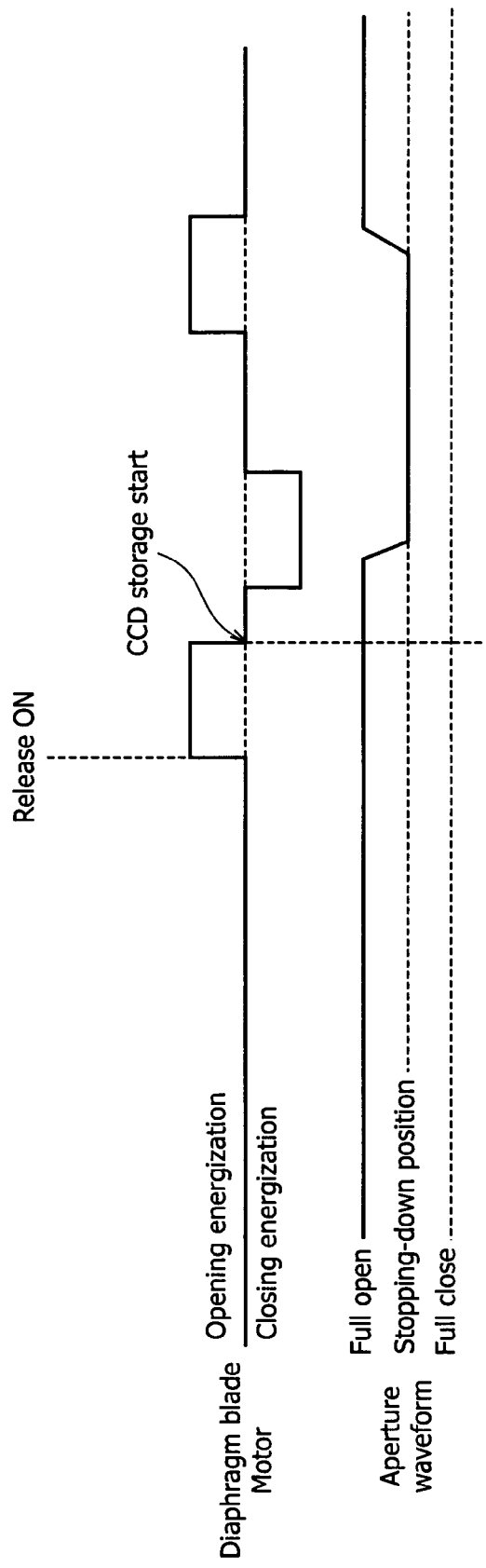
FIG. 12 is a time chart that shows a driving control of the blade driving device shown in FIG. 11.

When an operator performs a releasing operation herein so as to turn on the releasing switch 37, opening energization is first applied to the motors 25 and 25' through the motor driving circuit 34 as shown in FIG. 6 and FIG. 12 (i.e., the motors 25 and 25' are supplied with an electric current sufficient to completely move the shutter blade 24 and the diaphragm blade 24' from a closed state (stopped-down state) to an opened state (non-stopped-down state)).

If the portable telephone is not dropped or is not bumped against another object at this time, in other words, when the main body 10 is in a state of receiving no impulsive force from the outside, the shutter blade 24 and the diaphragm blade 24' are already in an opened state (non-stopped-down state), and this state is maintained.

On the other hand, when the portable telephone is dropped or bumped, and the main body 10 receives an impulsive force exceeding a predetermined level so that the shutter blade 24 or the diaphragm blade 24' moves to the closed state (or the stopped-down state) without permission. The shutter blade 24 or the diaphragm blade 24' is brought into an appropriate opened state (non-stopped-down state) by the motors 25 or 25'. As a result, a photographable state is reached.

Thereafter, the amount of light of a photographic subject is measured on the basis of an image signal of the CCD 23, and exposure time is calculated. The CCD 23 is temporarily turned off through the CCD driving circuit 32 and is again turned on to start storing the electric charge. If the diaphragm blade 24' is required to make a stopping-down motion, closing energization is applied to the motor 25' through the motor driving circuit 34 as shown in FIG. 12, and the diaphragm blade 24' immediately makes a stopping-down motion (closing motion). After a predetermined period of time (exposure time) passes, closing energization is applied to the motor 25 through the motor driving circuit 34 as shown in FIG. 6, and the shutter blade 24 immediately makes a closing motion. As a result, photography of a still image is completed.

Thereafter, the image signal stored in the CCD 23 is stored in the storage section 35 through the image signal processing circuit 33. Opening energization is again applied to the motors 25 and 25' through the motor driving circuit 34, and the shutter blade 24 and the diaphragm blade 24' are brought into the opened state (non-stopped-down state). Thereby, it becomes possible to photograph a dynamic image, and, simultaneously, a photographic standby state for a still image is reached.

As described above, regardless of whether the shutter blade and the diaphragm blade 24' are in the opened state (non-stopped-down state) or in the closed state (stopped-down state), the control unit 31 applies opening energization to the motors 25 and 25' so as to bring the shutter blade 24 and the diaphragm blade 24' into the opened state (non-stopped-down state) immediately before photographing a still image, especially when a releasing operation is performed. Therefore, for example, when the main body 10 receives an impulsive force from the outside so as to close the shutter blade 24 or the diaphragm blade 24' without permission, the device can be reliably returned to the photographable state. Additionally, since opening energization is invariably applied in each photographing operation regardless of the states of the shutter blade 24 and the diaphragm blade 24', a control operation can be simplified.

Referring now to the time charts of FIG. 7 and FIG. 13, a description will be given of the photographing operation and a method for driving the shutter blade and the diaphragm blade. First, when the main switch 36 of the camera unit 20 is turned on, electric power is supplied to the CCD 23, and opening energization is applied to the motors 25 and 25' through the motor driving circuit 34, so that the shutter blade 24 and the diaphragm blade 24' reach an opened state in which the optical path is opened (i.e., the aperture B1 is opened). In this opened state, a dynamic image can be photographed with the camera unit 20, and, simultaneously, a photographic standby state in which a still image is photographed is reached.

Figure 13:
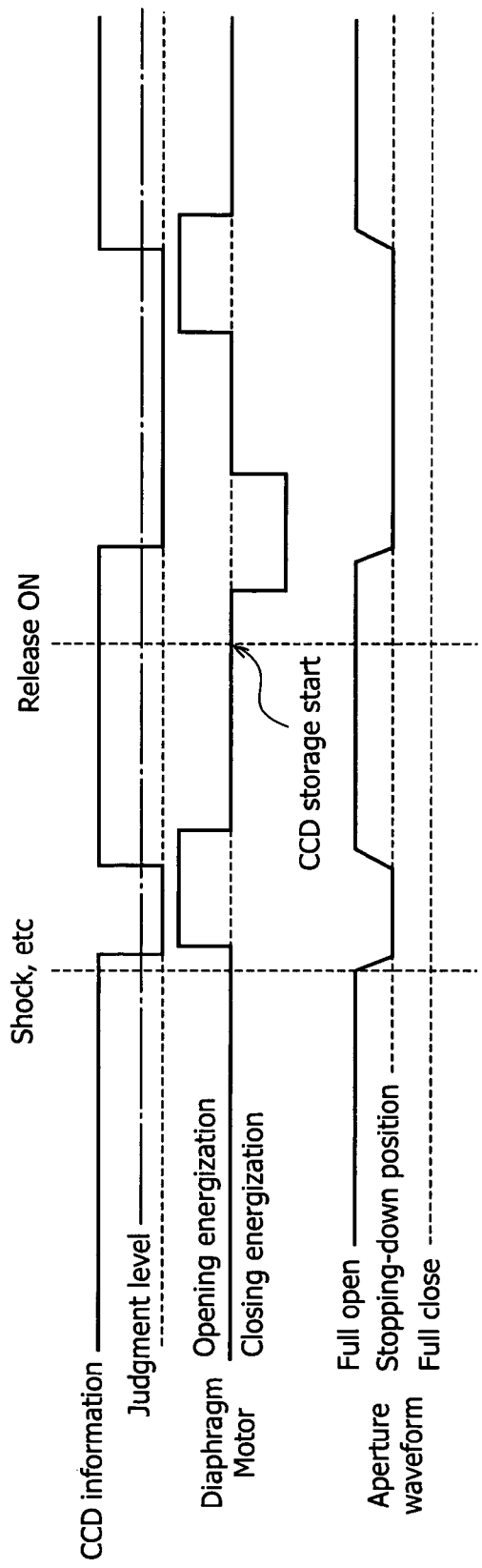
FIG. 13 is a time chart that shows another driving control of the blade driving device shown in FIG. 11.

In the photographic standby state for a still image, when the portable telephone is dropped or bumped so that the main body 10 receives an impulsive force exceeding a predetermined level, and the shutter blade 24 moves to a closed state without permission as shown in FIG. 7, or, when the diaphragm blade 24' is closed without permission and moves to a stopped-down state as shown in FIG. 13, the control unit 31 judges that the amount of light is below a predetermined level in accordance with an image signal (shade information) of the CCD 23 (i.e., the control unit 31 judges that the shutter blade 24 or the diaphragm blade 24' is closed), and opening energization is beforehand applied to the motors 25 and 25' through the motor driving circuit 34 (i.e., the motors 25 and 25' are supplied with an electric current sufficient to completely move the shutter blade 24 and the diaphragm blade 24' from a closed state (stopped-down state) to an opened state (non-stopped-down state)). Thereby, the shutter blade 24 and the diaphragm blade 24' are brought into an appropriate opened state (non-stopped-down state), and, as a result, a photographable state is reached.

On the other hand, if the portable telephone is not dropped or is not bumped against another object, in other words, when the main body 10 is in a state of receiving no impulsive force from the outside, the shutter blade 24 and the diaphragm blade 24' are already in an opened state (non-stopped-down state). Therefore, the control unit 31 maintains the photographic standby state without generating any control signals.

When the operator performs a releasing operation and turns on the releasing switch 37, the amount of light of a photographic subject is measured on the basis of an image signal of the CCD 23, and exposure time is calculated. Thereafter, the CCD 23 is temporarily turned off through the CCD driving circuit 32 and is again turned on to start storing the electric charge. If the diaphragm blade 24' is required to make a stopping-down motion, closing energization is applied to the motor 25' through the motor driving circuit 34 as shown in FIG. 13, and the diaphragm blade 24' immediately makes a stopping-down motion (closing motion). After a predetermined period of time (exposure time) passes, closing energization is applied to the motor 25 through the motor driving circuit 34 as shown in FIG. 7, and the shutter blade 24 immediately makes a closing motion. Thereby, photography of a still image is completed.

Thereafter, the image signal stored in the CCD 23 is stored in the storage section 35 through the image signal processing circuit 33. Opening energization is again applied to the motors 25 and 25' through the motor driving circuit 34, and the shutter blade 24 and the diaphragm blade 24' are brought into the opened state (non-stopped-down state). Thereby, it becomes possible to photograph a dynamic image, and, simultaneously, a photographic standby state for a still image is reached.

As described above, since the control unit 31 applies opening energization to the motors 25 and 25' so as to bring the shutter blade 24 and the diaphragm blade 24' into the opened state (non-stopped-down state) only when the amount of light obtained from the CCD 23 is below a predetermined level, a wasteful control operation is not performed when the shutter blade 24 and the diaphragm blade 24' are already in the opened state (non-stopped-down state), and therefore power consumption and the like can be reduced correspondingly thereto.

In the aforementioned embodiments, descriptions have been individually made of the method for always applying opening energization to the motors 25 and 25' in each photographing operation regardless of the states of the shutter blade 24 and the diaphragm blade 24', the method for applying opening energization to the motors 25 and 25' on the basis of information concerning the amount of light obtained from the CCD 23, and the method for applying opening energization to the motor 25 on the basis of a signal output from the shock sensor 38. However, without being limited to this, the present invention may employ a structure having two of the methods or a structure having a combination of all of the methods.

In the aforementioned embodiments, a camera unit of a monofocal lens optical system including the two lenses 21 and 22 and the shutter blade 24 or the diaphragm blade 24' disposed therebetween has been used as the camera unit 20. However, without being limited to this, the present invention may be applied to a camera unit of a zoom lens optical system including a shutter blade or a diaphragm blade.

In the aforementioned embodiments, the moving magnet type motors 25 and 25' have been used as an electromagnetic actuator for driving the shutter blade 24 and the diaphragm blade 24' of the camera unit 20. However, without being limited to this, the present invention may be applied to a structure including another type of electromagnetic actuator as long as the actuator is used to open and close the shutter blade and the diaphragm blade.

Figure 14:
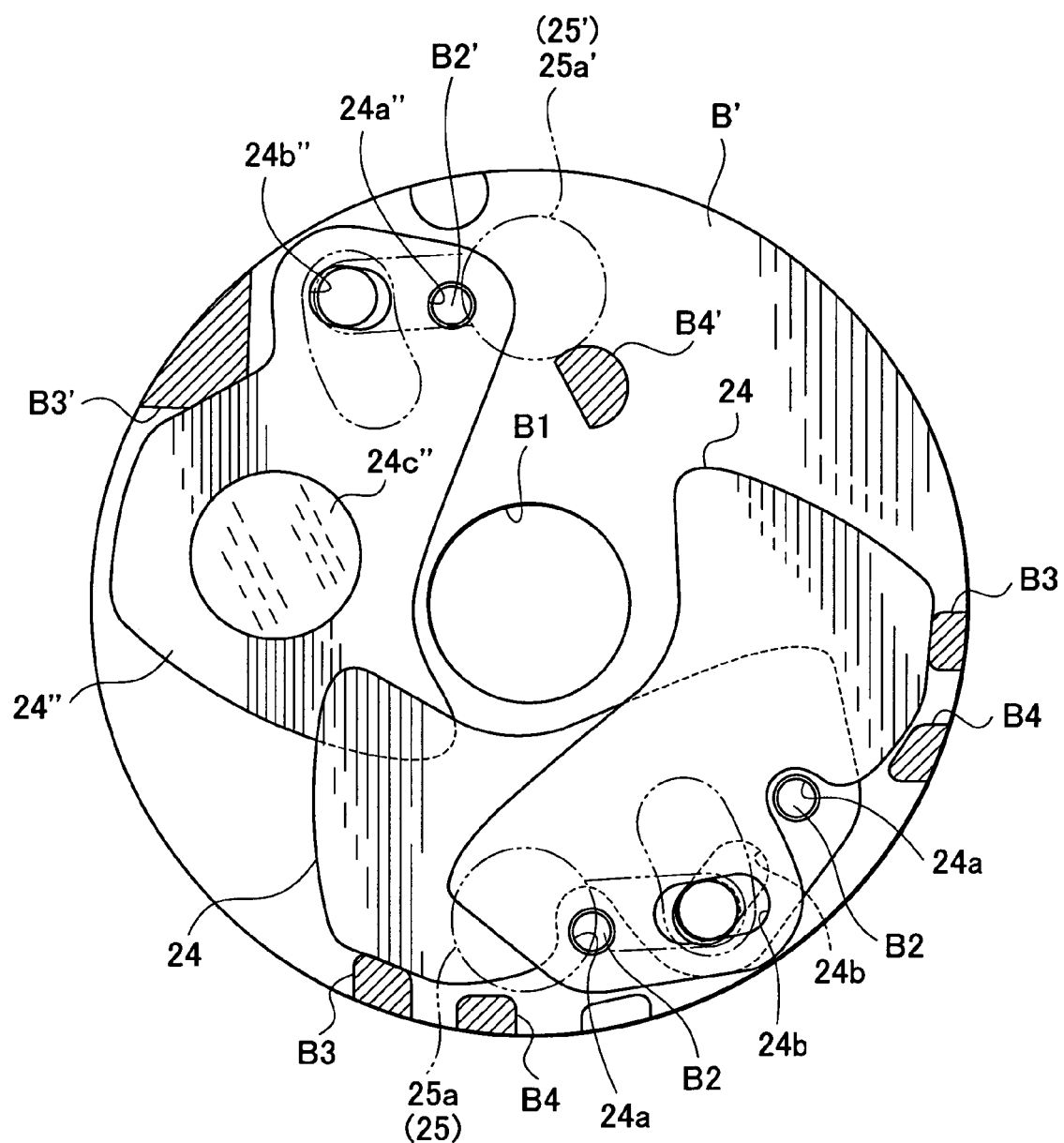
FIG. 14 is a plan view that shows another embodiment of the blade that blocks a part or all of light passing through the aperture or that reduces light passing therethrough.

In the aforementioned embodiments, the shutter blade 24 and the diaphragm blade 24' have been used as blades. However, without being limited to this, the present invention may employ an ND filter blade 24" including a circular hole 24a" into which a spindle B2' is inserted, a long hole 24b' into which a driving pin is inserted, and an ND filter 24c' attached in such a manner as to cover a circular aperture, as shown in FIG. 14, so that the amount of light passing through the aperture B1 is reduced almost without bringing about color variations. Herein, "ND" is an abbreviation for neutral density.

In the aforementioned embodiments, the portable telephone has been used as a portable information terminal including a camera unit to which the present invention is applied. However, without being limited to this, the present invention may employ a portable personal computer or the like as long as the computer receives an impulsive force, for example, when dropped.

As described above, according to the blade driving device for use in cameras according to the present invention, in the structure including the mechanical blade that is disposed in front of the image pickup element and that is capable of blocking a part or all of the light passing through the exposure aperture or capable of reducing light passing therethrough and the electromagnetic actuator that opens and closes the blade, the blade always reaches an opened state prior to a photographing operation by allowing the blade to beforehand make an opening motion before making a closing motion even if the blade being kept in the opened state is closed without permission by, for example, an impulsive force from the outside, and therefore photography can be reliably performed.

Especially when opening energization is always applied regardless of the state of the blade, a control operation can be simplified. Further, when opening energization is applied in response to a releasing operation, the blade can be reliably brought into an opened state immediately before photography merely by controlling the device at least once. Further, when opening energization is applied based on information (shade information) concerning the amount of light incident on the image pickup element or based on a signal output from the shock sensor, power consumption can be reduced by stopping unnecessary control operations.

What is claimed is:

1. A blade driving device for use in cameras, the blade driving device comprising:
  a mechanical blade openably and closably disposed in front of an image pickup element, the mechanical blade being operable to block a part or all of light passing through an exposure aperture or to reduce light passing therethrough;
  an electromagnetic actuator being operable to enable the mechanical blade to perform an opening motion according to opening energization and to enable the mechanical blade to perform a closing motion according to closing energization; and
  a control means for drive-controlling the electromagnetic actuator and applying opening energization and closing energization to the electromagnetic actuator so as to allow the mechanical blade to perform an opening motion to move into an opened state when turning on an electric-power supply in order to set a photographable standby state in which a dynamic image and a still image are photographable, and to first perform an opening motion when a releasing operation is performed, and then to perform a closing motion for completion of a photograph,
  wherein the control means applies opening energization to the electromagnetic actuator so as to allow the mechanical blade to perform an opening motion when a signal exceeding a predetermined level is output from a shock sensor used to detect an impulsive force in the photographable standby state.

2. The blade driving device for use in cameras as set forth in claim 1, wherein the mechanical blade is a shutter blade that opens and closes the exposure aperture.

3. The blade driving device for use in cameras as set forth in claim 1, wherein the mechanical blade is a diaphragm blade that is operable to close the exposure aperture to a predetermined aperture diameter.

4. The blade driving device for use in cameras as set forth in claim 1, wherein the mechanical blade is an ND filter blade that reduces an amount of light passing through the exposure aperture to a predetermined level.

5. The blade driving device for use in cameras as set forth in claim 1, wherein:
  the control means applies opening energization to the electromagnetic actuator so as to allow the mechanical blade to perform an opening motion when an amount of light incident on the image pickup element becomes equal to or less than a predetermined level in the photographable standby state.

6. The blade driving device for use in cameras as set forth in claim 5, wherein the mechanical blade is a shutter blade that opens and closes the exposure aperture.

7. The blade driving device for use in cameras as set forth in claim 5, wherein the mechanical blade is a diaphragm blade that is operable to close the exposure aperture to a predetermined aperture diameter.

8. The blade driving device for use in cameras as set forth in claim 5, wherein the mechanical blade is an ND filter blade that reduces an amount of light passing through the exposure aperture to a predetermined level.

9. The blade driving device for use in cameras as set forth in claim 1, wherein the mechanical blade is a shutter blade that opens and closes the exposure aperture.

10. The blade driving device for use in cameras as set forth in claim 1, wherein the mechanical blade is a diaphragm blade that is operable to close the exposure aperture to a predetermined aperture diameter.

11. The blade driving device for use in cameras as set forth in claim 1, wherein the mechanical blade is an ND filter blade that reduces an amount of light passing through the exposure aperture to a predetermined level.

\* \* \* \* \*